(12) United States Patent
Maciocci (10) Patent No.: US 9,137,524 B2
(45) Date of Patent: Sep. 15, 2015

(54) SYSTEM AND METHOD FOR GENERATING 3-D PLENOPTIC VIDEO IMAGES

(71) Applicant: QUALCOMM Incorporated, San Diego, CA (US)

(72) Inventor: Giuliano Maciocci, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 13/686,456

(22) Filed: Nov. 27, 2012

(65) Prior Publication Data

US 2014/0146148 A1 May 29, 2014

(51) Int. Cl.
| | |
|---|---|
| *G06F 3/13* | (2006.01) |
| *H04N 13/04* | (2006.01) |
| *G06F 3/01* | (2006.01) |
| *H04N 13/02* | (2006.01) |

(52) U.S. Cl.
CPC ............ *H04N 13/0484* (2013.01); *G06F 3/013* (2013.01); *H04N 13/0232* (2013.01)

(58) Field of Classification Search
None
See application file for complete search history.

(56) References Cited

U.S. PATENT DOCUMENTS

| | | | |
|---|---|---|---|
| 5,467,104 A | 11/1995 | Furness, III et al. | |
| 6,466,250 B1 | 10/2002 | Hein et al. | |
| 7,239,293 B2 | 7/2007 | Perlin et al. | |
| 2008/0131019 A1 | 6/2008 | Ng | |
| 2011/0228051 A1 | 9/2011 | Dedeoglu et al. | |
| 2011/0273369 A1 | 11/2011 | Imai et al. | |
| 2012/0019703 A1 | 1/2012 | Thorn | |
| 2013/0128087 A1* | 5/2013 | Georgiev et al. | 348/307 |
| 2014/0055352 A1* | 2/2014 | Davis et al. | 345/156 |
| 2014/0204003 A1* | 7/2014 | Deering et al. | 345/8 |

FOREIGN PATENT DOCUMENTS

EP   2403234 A1   1/2012

OTHER PUBLICATIONS

International Search Report and Written Opinion—PCT/US2013/069875—ISA/EPO—Feb. 6, 2014.
Kauff et al., "Depth Map Creation and Image-Based Rendering for Advanced 3DTV Services Providing Interoperability and Scalability", Signal Processing. Image Communication, Elsevier Science Publishers, Amsterdam, NL, vol. 22, No. 2, Mar. 16, 2007, pp. 217-234, XP005938670, ISSN: 0923-5965, DOI: 10.1016/J.Image.2006.11.013.

(Continued)

*Primary Examiner* — William C Vaughn, Jr.
*Assistant Examiner* — Eileen Adams
(74) *Attorney, Agent, or Firm* — Knobbe Martens Olson and Bear LLP (57) ABSTRACT

Described herein is a system and method for displaying a stereoscopic plenoptic image or video to a user, with eye-tracking capabilities. A display device displays a plenoptic image or video on a screen, and focuses the plenoptic image or video at the depth plane corresponding to the eye-coordinates of the user's gaze. The focused depth plane in the displayed plenoptic frame updates as the frames progress in the video stream, thereby constantly re-focusing the depth plane of the currently displayed plenoptic frame depending on the location of the user's gaze.

20 Claims, 6 Drawing Sheets

(56) References Cited

OTHER PUBLICATIONS

Levoy M., et al., "Light Field Rendering ", Jul. 1, 1996, pp. 1-12, XP055077048.

Talmi K., et al., "Eye and gaze tracking for visually controlled interactive stereoscopic displays", Signal Processing. Image Communication, Elsvier Science Publishers, Amsterdam, NL, vol. 14, No. 10, Aug. 1, 1999, pp. 799-810, XP004173766, ISSN: 0923-5965, DOI: 1 0.1 016/S0923-5965(98)00044-7.

* cited by examiner

SYSTEM AND METHOD FOR GENERATING 3-D PLENOPTIC VIDEO IMAGES

BACKGROUND

1. Field of the Invention

The present invention generally relates to systems and methods for generating stereoscopic plenoptic video images, and more particularly to systems and methods for generating and displaying stereoscopic plenoptic video images by tracking a viewer's eye coordinates.

2. Background

3-D Stereoscopic video has a set focus, meaning that the illusion of depth is broken when viewers try to focus on an image outside the set depth plane. This effect can cause eyestrain in some viewers of 3-D content, as the eyes attempt (and fail) to focus on content outside the set depth plane of the scene as it was originally filmed. Plenoptic (a.k.a. 'light field') camera technology allows images to be captured that can be focused after the image is captured. In a traditional application setting, this allows for any object in a plenoptic image to be brought into sharp focus, no matter what focal plane the object is contained in.

In traditional photography, the area of focus of an image is configured prior to taking the picture. After the picture has been taken, the area of focus is set and the area which is out of focus cannot be made in focus. Conversely, a light-field, or a plenoptic camera, uses special lenses and sensors to capture the entire light field within the scope of a scene. Thus, a plenoptic camera is able to capture all the light traveling in every direction in every point in space. With a plenoptic camera, since the color, direction, and intensity of all light is captured, focusing is performed using software after the picture has been taken. Focusing after the picture has been taken allows the user to modify the area of the image which is in focus at any time.

SUMMARY

In one embodiment, the invention provides a system for generating plenoptic images. The system comprises a plenoptic image source capable of generating at least one plenoptic image. The system further comprises a depth mapping module configured to assign objects in the at least one plenoptic image to a depth plane. The system further comprises a display for displaying the at least one plenoptic image. The system further comprises an eye-tracking system configured to track the position of a user's gaze on the display, and setting the focal plane of the displayed image to a depth plane being viewed by the user.

In another embodiment, the invention provides a method for setting a focal plane of an image viewed by a user. The method comprises generating at least one plenoptic image. The method further comprises mapping objects in the at least one plenoptic image to a depth plane. The method further comprises displaying the at least one plenoptic image. The method further comprises tracking the position of a user's gaze and the display and setting the focal plane of the displayed image to a depth plane being viewed by the user.

In another embodiment, the invention provides a system for setting a focal plane of a plenoptic image. The system comprises means for generating at least one plenoptic image. The system further comprises means for mapping objects in the at least one plenoptic image to a depth plane. The system further comprises means for displaying the at least one plenoptic image. The system further comprises means for tracking the position of a user's gaze on the display. The system further comprises means for setting the focal plane of the displayed image to a depth plane being viewed by the user.

DETAILED DESCRIPTION

Embodiments of the invention relate to systems and methods for displaying a stereoscopic plenoptic image to a user. A plenoptic image contains enough information to display that image stereoscopically, from a single plenoptic image. Since a plenoptic camera records depth information (allowing focus at variable depths), stereoscopic images can be constructed in software from a single plenoptic image capture. A plenoptic camera uses a microlens arrays to capture "four-dimensional" light-field information. The microlens array can separate a fraction of incident rays on the microlens into bundles that originate from the same position but under different angular directions. Thus, a captured plenoptic image contains enough information to recreate, a posteriori, a volume of image covering a range of focus distances. By matching pairs of images at different focal distances and depths, a plenoptic image can be displayed stereoscopically to a user for 3-D applications.

Embodiments generally relate to systems and methods that use plenoptic images to create a still image or video wherein different depth portions of the image or video may be focused on by a user through the use of eye tracking. Thus, in some embodiments a stream of individual plenoptic images are combined into a sequence of frames in order to create a 2-D or 3-D movie sequence containing multiple depth plane information. Each frame of plenoptic data may be combined at a standard rate of, for example, 30 frames per second for display to the user. As a particular video frame is being displayed to the user, the system would calculate a per-frame coordinate map linking the 2-D screen coordinates of certain features of the image to its proper depth plane. For example, a tree in a foreground of a scene would be assigned to a front depth plane, and a mountain in the background would be assigned to a second depth plane. Different numbers of depth planes may be used for each scene of the movie. Simple scenes with only a few elements may have 2-5 depth planes, whereas more complicated scenes with many elements may have 6-10 depth planes.

Once the 2-D coordinates of each feature of the image are assigned to a depth plane, the frame may be displayed onto a standard or stereoscopic display, such as a 3-D television. In order to properly focus the user's eyes onto the right depth plane, the system would include an eye tracking component that would detect the position of where the user was focusing on the display and then re-focus the rendered plenoptic images at the depth plane corresponding to the screen coordinates containing the viewer's gaze. Examples of eye tracking devices for use in this embodiment are well known, such as the IS-1 or IS-2 Eye Tracker by Tobii Technology, Inc (Fall Church, Va.). These particular devices use infrared light to reflect off a user's cornea in order to track the position and gaze of a user's eyes. Other systems may integrate a camera, infrared laser or sensor in a heads up display or glasses worn by the user to calculate the point in the image being focused on by the user at any point in time.

This combination of elements results in a system that displays reactive images or movies that respond to changes in where a user is gazing by adapting the focal plane of the displayed image to the depth plane being currently viewed by the user. This system thus allows for a user to have a clear focus of any part of a displayed scene, at any perceived depth, in a 2-D or stereoscopic view (3-D).

Figure 1:
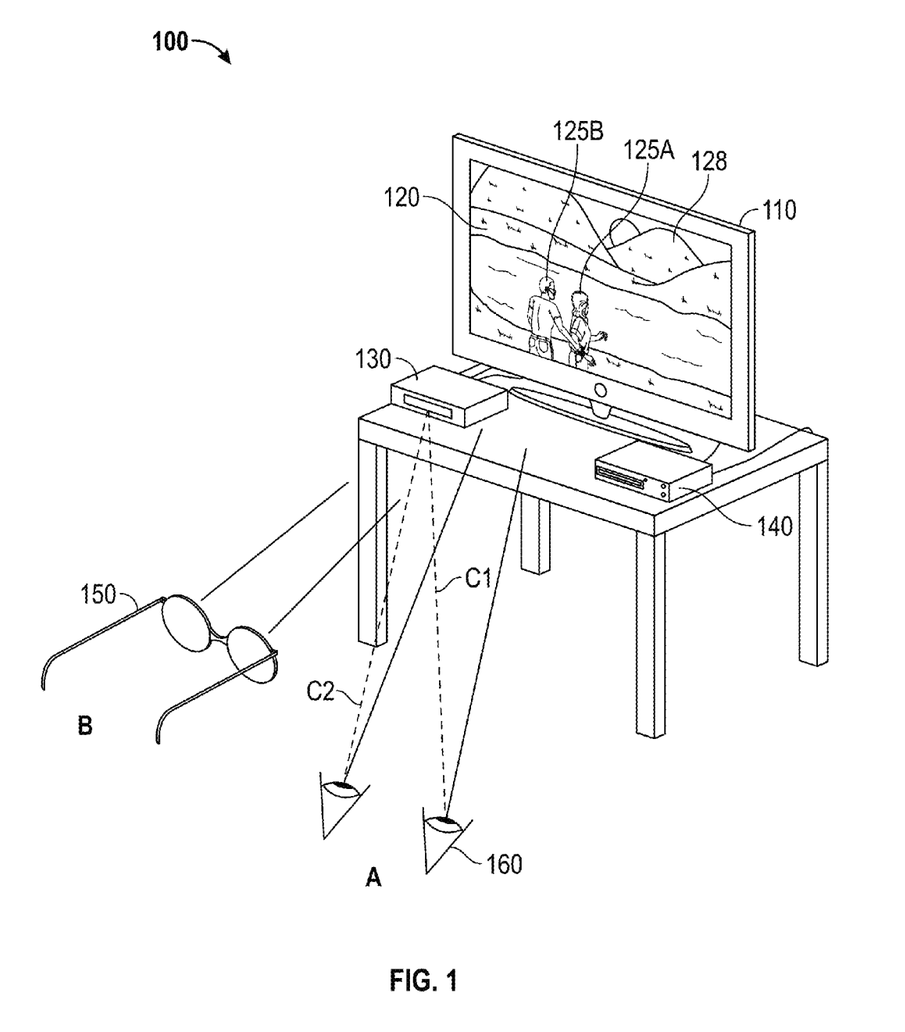
FIG. 1 is an illustration of a user viewing a 3-D plenoptic image on a screen with user eye tracking via glasses (B) or via infra-red (A).

FIG. 1 is an illustration of one embodiment of a plenoptic video system 100 for displaying plenoptic images and videos to a user. A display device 110, such as but not limited to a television screen, displays plenoptic video information 120 to the user. The screen 110 may display, for example, a single plenoptic image, a 2-D plenoptic image or 3-D plenoptic video. In the embodiment shown in FIG. 1, plenoptic image 120 includes a first person 125A and a second person, 125B in the foreground of the displayed image. In addition there is a mountain 128 shown as part of a scene in the background of the displayed image. The foreground having the images of the persons 125A,B may represent one depth plane, while the background scene of the mountains 128 may represent a second depth plane. There may be any number of depth planes in a plenoptic frame, with each depth plane representing a different portion of the displayed scene.

The display device 110 may be connected to a hardware device 140 that sends the plenoptic data to the display device 110. The hardware device 140 may comprise, for example, a Blu-Ray disc player or a storage device storing plenoptic video or image data. In one embodiment, represented in "A", a pair of viewer's eyes 160 is gazing at the plenoptic image or video 120 on the display device 110, and is tracked along lines $C_2$ and $C_2$ via the eye-tracking device 130. The eye-tracking device 130 may comprise an infra-red system to track the position and viewing angle of the viewer's eyes on the plenoptic image or video 120. By tracking the position and viewing angle of the viewer's eyes, the system can determine the place on the display 110 that the view is looking at during predefined time periods. For example, the system may track the viewer's eyes every second, half-second, quarter-second, or tenth of second as the viewer looks around on the display device 110. The eye-tracking device 130 may also allow additional users to view the plenoptic image or video 120 and separately track the position and gaze of each viewer in the room.

Once the system has calculated where the user is looking at any point in time, the system can determine the 2-D coordinates of the viewer's gaze on the display. For example, the system may divide the display into a two-dimensional grid and determine that the user is looking at position X=100, Y=200 within the predefined grid for the display 120. Once the coordinate position that the user is gazing at on the display is determined, the system will then determine which depth plane is being viewed. The system will then focus the displayed image for the viewer at the position and depth plane where the viewer is gazing. Thus, the displayed plenoptic image frame 120 will become focused at the depth plane corresponding to the viewer's gaze location.

For example, if the viewer is gazing at the person 125A in the foreground, the eye-tracking device 130 may track the eye gaze of the viewer as a coordinate location on the current frame 120 and focus the plenoptic frame at the corresponding depth plane ascribed to the person 125A. The system updates the depth plane that is in focus as the frames change. So, as the viewer's gaze location changes as the viewer looks at different places on the frame 120, the focused depth plane changes as the frames progress in the 2-D video stream. In addition, the plenoptic frame 120 may be a frame of a 3-D video stream.

Therefore, as the user changes the location of their gaze of the display screen 110, the system will bring a different depth plane into focus as the frames are displayed in the stereoscopic video stream. The result is similar in appearance to a "real-life" scene playing out in front of the user, instead of being displayed on a display device 110. In another embodiment, represented in "B", the viewer's eyes are tracked via a pair of eye-tracking glasses 150. In this embodiment, the display screen 110 comprises an internal or external receiver configured to transmit and receive data to and from the eye-tracking glasses 150. The eye-tracking glasses 150 actively track the position of the users gaze on the display screen, and transmit the user's gaze information to the display screen 110. The display screen 110 may then convert the gaze information, including any 2-D coordinates of the viewer's eye-coordinates, to a coordinate determination system for the screen. For example, if the viewer's eyes inside the glasses 150 are gazing at a location of the plenoptic frame 120 at a 2-D coordinate location of $(x_1, y_1)$, the display screen 110 may transform, using a direction cosine matrix or a mathematical transformation, the 2-D coordinate location to the equivalent position on the display screen 110 at coordinates $(x_1', y_1')$. Once the location of the viewer's gaze on the screen 110 is known, the plenoptic frame 120 can then focus at the corresponding depth plane so that the user sees a clear, focused image at the position where they are looking on the screen. As described above with respect to embodiment "A", the plenoptic video frame 120 may be a frame of either a 2-D or a 3-D video stream.

Figure 2:
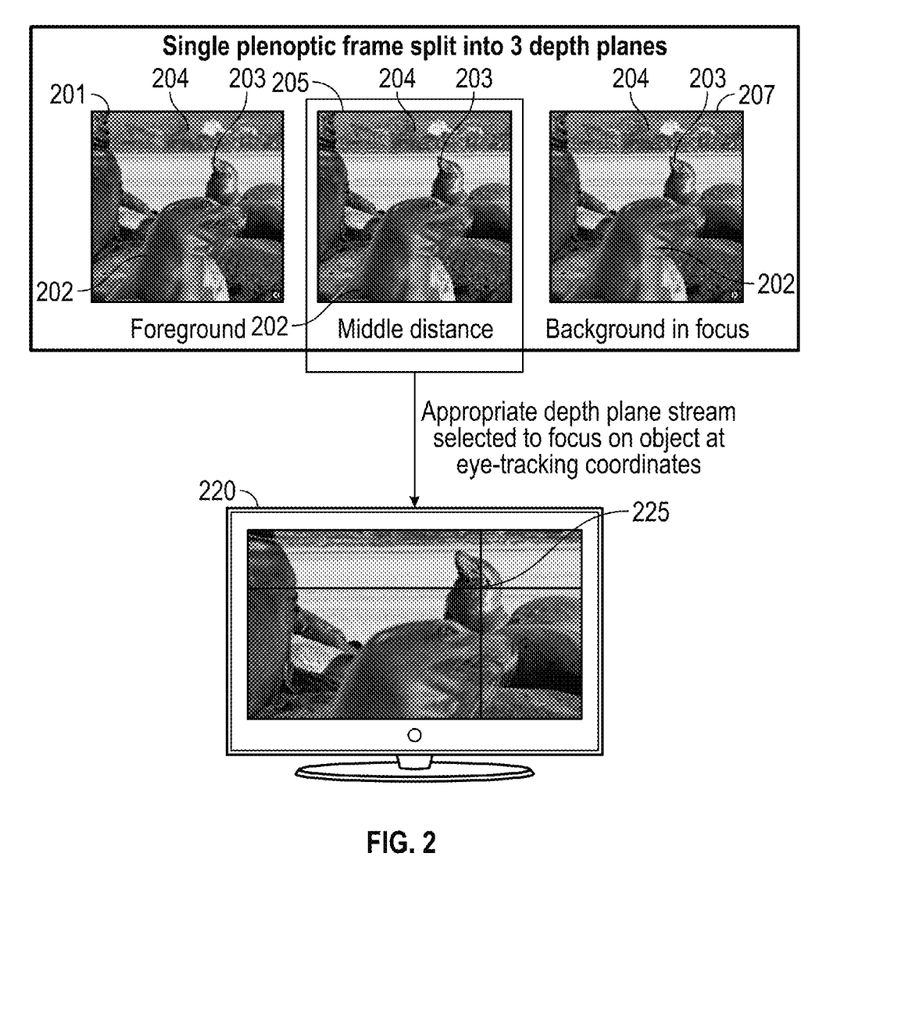
FIG. 2 is an illustration of a plenoptic image frame with 3 depth planes focused according to the eye coordinates of a user.

FIG. 2 shows different examples of the same captured plenoptic image that is focused at three different depth planes. In the first image 201, the foreground depth plane including a seal 202 is set to be the focal plane of the image. Thus, the forward seal 202 is shown as being in focus, while the middle seal 203 and mountain scene 204 are shown out of focus. In the second image 205, the focal plane is set to coincide with the middle depth plane so that the middle seal 203 in the center of the scene is brought into focus, while the forward seal 202 and the mountain scene 204 are blurry. The third image 207 shows an example wherein the focal plane is set to coincide with the background depth plane so that the mountain scene 204 is in focus, while the forward seal 202 and middle seal 203 are out of focus.

As shown in FIG. 2, a stereoscopic television 220 may display each plenoptic frame of the movie. As the frame is displayed, the gaze of the viewer's eyes are calculated and then a prediction is made as to where on the television 220 the user is looking at any particular time. In one embodiment, the viewer's eye movements are tracked in real time so that the images presented onto the television 220 are constantly going in and out of different focus, based on where the user is looking within the image at a particular time. Thus, system may monitor the user's gaze and predict, as shown by crosshair 225 the two dimensional coordinates of where the user is looking on the television at a particular time. From these coordinates, the system can predict which depth plane to bring into focus. For example, when the viewer is looking at the middle seal 203, the depth plane associated with that seal will be brought into focus so that the user will have a clear picture of the middle seal. The system is then configured to change the focus of the plenoptic image, and continually update the displayed focal plane to coordinate with the depth plane of the feature being specifically viewed by the user. This allows the system to continually present focused stereoscopic information to the user.

Figure 3:
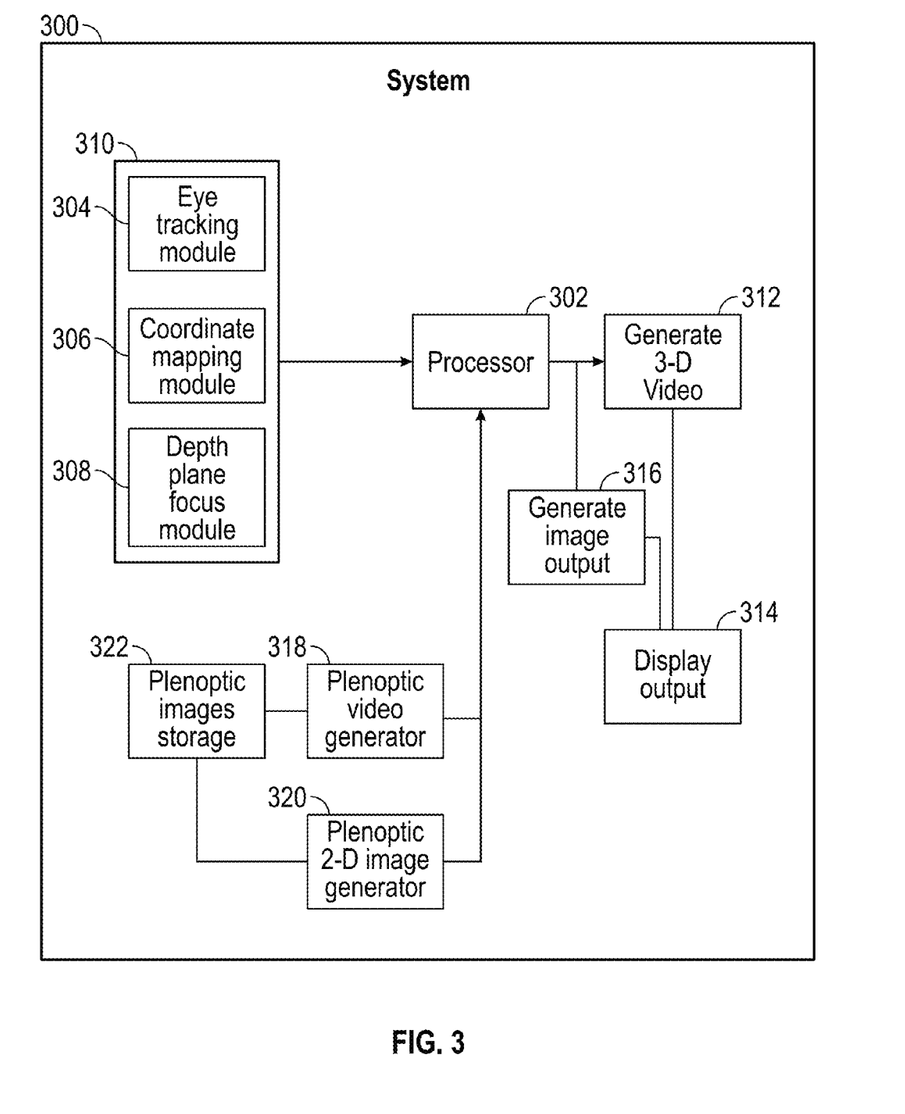
FIG. 3 is a block diagram of a system level overview according to one embodiment of the present invention.

FIG. 3 is a block diagram of a system 300, which may be similar to the system 100 of FIG. 1. A set of system modules 310 is shown that act together within the system to provide many of the functions of the eye-tracking and depth plane focusing system. An eye tracking module, 304, is responsible for tracking the coordinates of a viewer's eyes while gazing at a displayed plenoptic video or image. The viewer's eyes may be tracked, for example, via eye-tracking glasses, or an infrared system. The coordinate mapping module 306 is configured to transform the coordinate plane of the viewer's eyes to the respective coordinate plane of the display device.

The 2-D coordinate location of the viewer's gaze on the display device may determine which depth plane may be focused on the currently displayed plenoptic frame. A depth plane focus module, 308, is configured to focus the currently displayed plenoptic frame at the depth module corresponding to the location of the viewer's gaze on the frame. For example, if the currently displayed plenoptic frame comprises ten different depth planes, the depth plane focus module 308 may calculate which of the ten depth planes corresponds to the viewer's 2-D coordinate location (as calculated by module 306), and focus one of the ten depth planes of the currently displayed plenoptic frame accordingly.

A plenoptic images storage 322 is configured to store plenoptic images to be displayed by the system 300. A plenoptic 2-D image generator module 320 may retrieve the plenoptic images from the plenoptic images storage 322 that are queued for display. A plenoptic video generator module 318 may be configured to retrieve a sequence of plenoptic images from the plenoptic images storage 322 and convert them into a video stream. Also within the system 300 can be a processor 302 configured to combine the set of modules 310 for eye-tracking and depth plane focusing with either of the plenoptic video or image source modules 318 and 320. Video Generation Module 312 may be configured to convert the 2-D video stream output from plenoptic video module 318 into a 3-D plenoptic video stream. In addition, the system 300 may be configured to allow the 2-D video signal to pass-through module 312 in order to display a 2-D video stream. Display output 314 may be configured to display the 3-D video on a display device, such as a monitor or television. The generate image output module 316 may convert a single plenoptic image or frame in a format for display on the display output 314.

Figure 4:
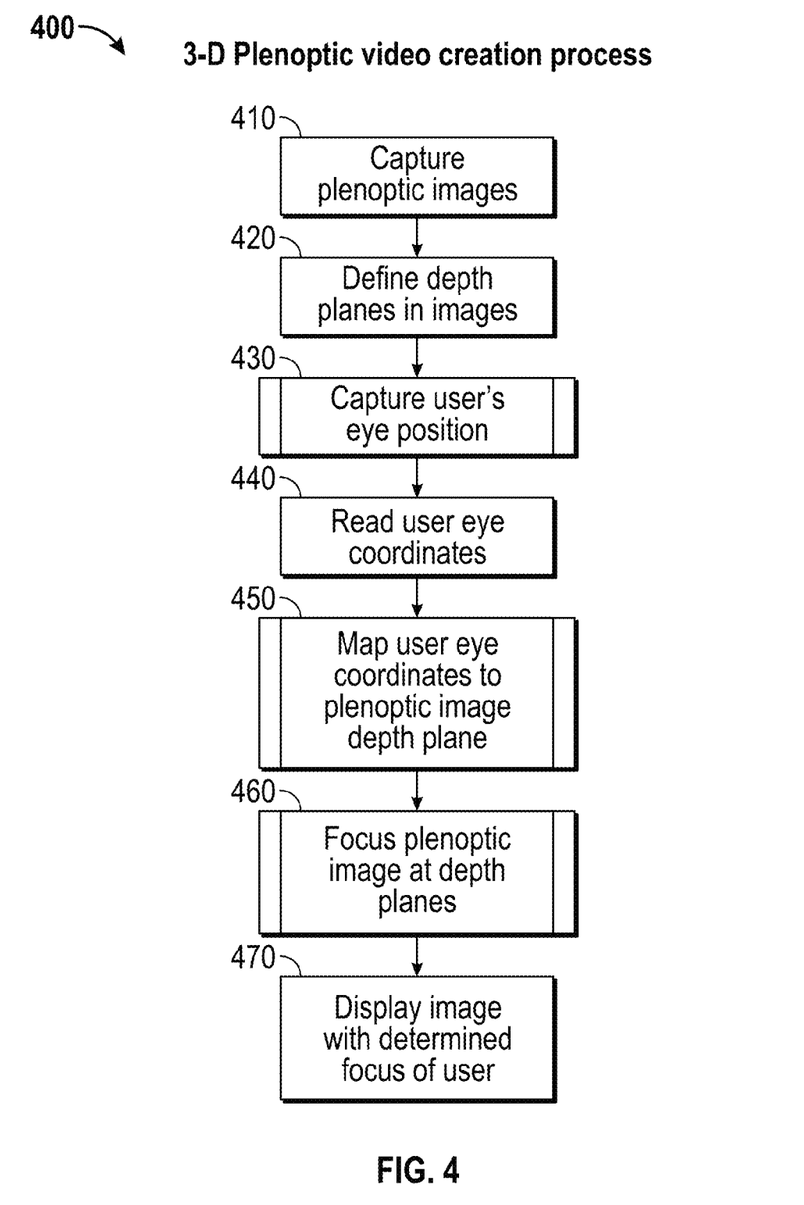
FIG. 4 is a flow diagram showing an overview of a process for generating 3-D plenoptic video.

FIG. 4 is a flow diagram showing one embodiment of a process 400 for generating 3-D plenoptic video as discussed herein. The process 400 begins at a block 410 for capturing plenoptic images. The plenoptic images may be captured via a plenoptic camera such as the "Red Hot" model (lytro.com; Mountain View, Calif.), or a plenoptic video recording device configured to capture a video stream of plenoptic images. At block 410, the process 400 may also capture a stream of plenoptic images and "stitch together" the captured images in a sequence to create a video stream. The process 400 then moves to a block 420 wherein the depth planes in the plenoptic images are defined.

For example, in a simple plenoptic frame with a person in the foreground and a tree in the background, the process block 420 may define only two depth planes. Conversely, in a more complex plenoptic frame comprising multiple depth areas, the process 400 at block 420 may define many more depth planes in an image, wherein each depth plane represents a different area of depth within the plenoptic image. The process 400 then continues to process block 430 to capture a viewer's eye position. This process 430 of capturing a viewer's eye position will be described in greater detail with respect to FIG. 5 below.

Once the viewer's eye coordinates are captured, the process 400 continues to block 440 to read the eye coordinate information. The eye coordinate information is the determined coordinate position on the display device being viewed by the viewer where the viewer is looking at that particular time. The process 400 then moves to process block 450 to map the user's eye coordinates to a coordinate plane of the displayed plenoptic frame and corresponding depth plane. Process 450 will be described in greater detail with respect to FIG. 6 below.

Next, the process 400 moves to a process block 460 wherein the plenoptic frame or image is focused at the depth plane corresponding to the location of the viewer's gaze. This process will be described in greater detail with respect to FIG. 7 below. Finally, the process 400 moves to block 470 and displays the plenoptic frame that has been focused at the depth plane corresponding to the viewer's present gaze location.

The process 400 then repeats for each plenoptic frame in a sequence of plenoptic frames in a video stream. Therefore, each plenoptic frame in the video sequence re-defines the viewer's 2-D gaze coordinates, depth planes and focus area. The resulting 3-D video has a "real life" appearance, with the focused regions of each plenoptic frame in the plenoptic video stream consistently updating based on the viewer's gaze location.

Figure 5:
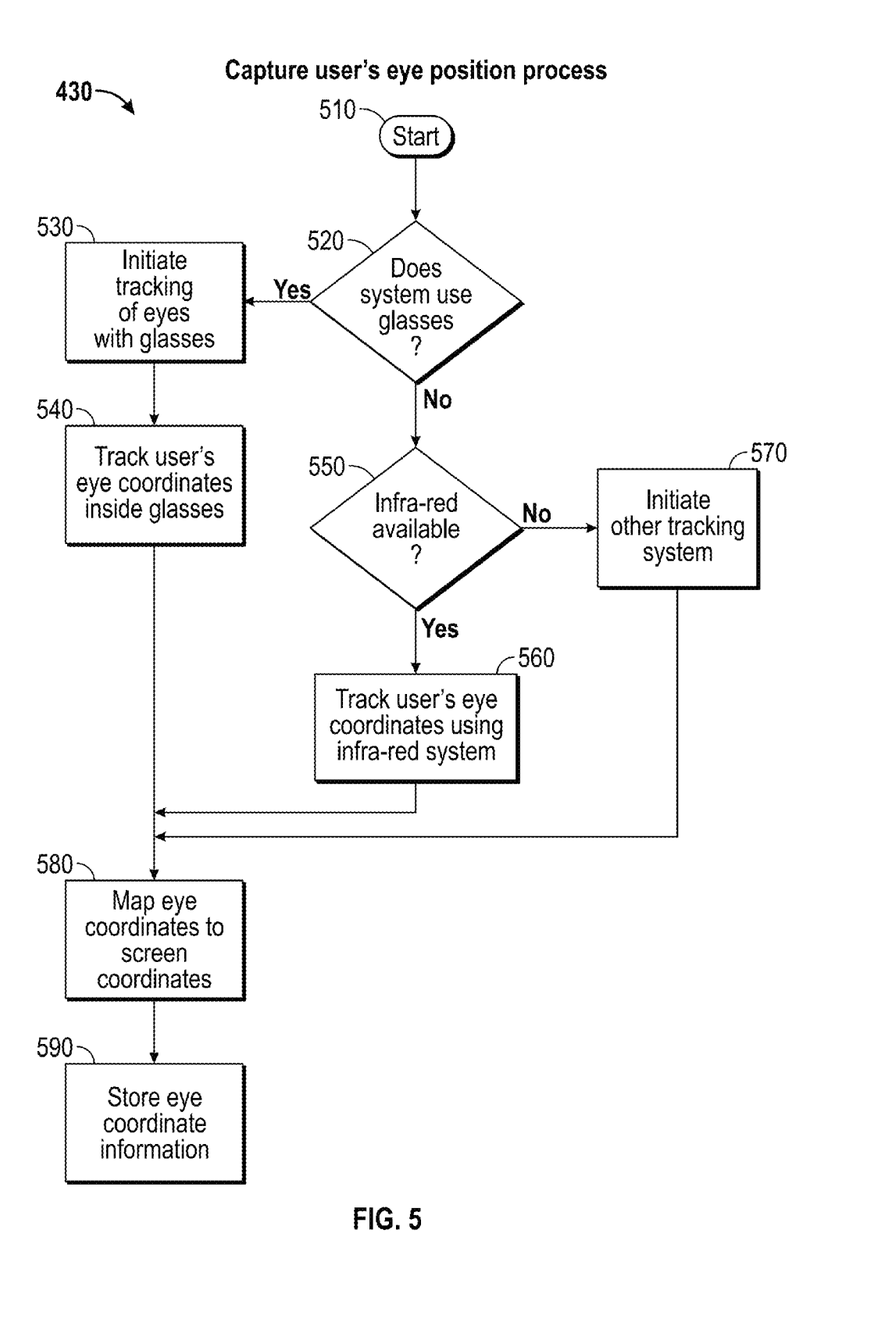
FIG. 5 is flow diagram showing an overview of a process for capturing a user's eye position.

FIG. 5 illustrates in further detail the process undertaken in process block 430 for capturing a user's eye position. The process 430 begins at a start block 510 and then moves to a decision block 520 wherein a determination is made whether or not the system detects that the viewer is using eye-tracking glasses. If the viewer is found to have activated eye-tracking glasses, the process moves to block 530 to initiate tracking of the viewer's eyes. Next, the process moves to block 540 to begin tracking the viewing coordinates of the viewer's eyes inside the glasses corresponding to the 2-D coordinate location of the area of the plenoptic image displayed to which the user is gazing at. The process then moves to a block 580 which maps the coordinates of the user's eyes to the corresponding coordinates of the displayed plenoptic image on the display screen. This transformation would vary depending on the size of the displayed plenoptic image and screen size. The process then moves to a block 590 to store the viewer's current eye coordinate information within the system.

Moving back to decision block 520, if a determination is made that the viewer has not activated eye-tracking glasses, the process moves to decision block 550 to determine if an infra-red system is available for tracking a viewer's eyes. If there is an infra-red eye tracking system available, the process moves to block 560 to track the coordinates of the viewer's eyes corresponding to the 2-D coordinate location of the area of the plenoptic image displayed to which the user is gazing at. The process then moves to block 580 to map the eye coordinates of the user's eyes to the position that the user is looking at on the display screen. The process 430 then moves to block 590 to map and store the coordinates in the system.

If a determination is made at decision block 550 that an infra-red eye tracking system is not available for eye tracking, the process moves to block 570 to initiate other tracking systems for tracking a viewer's eye coordinates. The process then moves to blocks 580 and 590 as discussed above to map and store the coordinates of the display that the user it gazing at, as discussed above.

Figure 6:
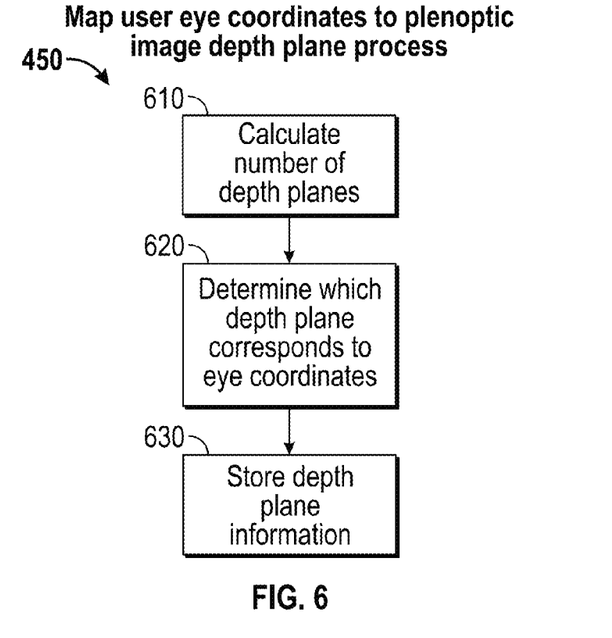
FIG. 6 is a flow diagram showing an overview of a process for mapping a user's eye coordinates to a plenoptic image depth plane.

FIG. 6 reviews in further detail the process 450 for mapping a user's 2-D eye coordinates to a plenoptic image depth plane. The process begins at block 610 wherein the number of depth planes present in the currently displayed plenoptic frame is determined Next, once a determination is made of the number of depth planes in the currently displayed plenoptic frame, the process moves to block 620 to determine which of the depth planes within the currently displayed image corresponds to the location of the viewer's gaze. For example, if there are only two depth planes, and the user is gazing at a region of the plenoptic image that is in the area of the second depth plane, then the process will determine that the second depth plane is the depth plane corresponding to the current coordinates of the viewer's eyes. To accomplish this alignment of the users current gaze position and the correct depth plane being viewed, the system matches the current sight lines of the user to the position that those sight lines intersect with the display.

Thus, in one embodiment, the system determines the sight lines of the user's gaze toward the display. This can be calculated from determining each eye position and then projecting a line from the user's eye to the display. The display is normally in a fixed position relative to the user, and thus the system can be trained to know the display position relative to the user's eye position. For example, if the eye position is detected by an infrared detector attached to the display, then the detector would always have the same position relative to the display. Accordingly, by determining the position and direction of each pupil of the user in three dimensional space in front of the display, a vector can be determined that indicates the initial position and direction of the user's gaze. From this vector, the system can determine the point on the display wherein the vector bisects the display. This position on the display where the user's gaze is looking can then be used to determine which depth plane corresponds to the user's current gaze. In some embodiments, the display is divided into a two dimensional coordinate system and the system detects the X/Y coordinates at the position where the user's gaze is pointing on the display.

In addition to knowing the coordinates of where the user's gaze contacts the display, the system is also configured to have determined the equivalent position on the displayed frame. Thus, as each frame is displayed onto the display, the system can assign a coordinate system to that displayed image frame, with aligns the coordinates of the image with the coordinates of the display device. This allows the system to determine which coordinate position of the image is being viewed, when a particular coordinate position of the display device is being gazed upon by the user.

Finally, the process moves to block 630 to store the depth plane information corresponding to the viewer's eye coordinates.

Figure 7:
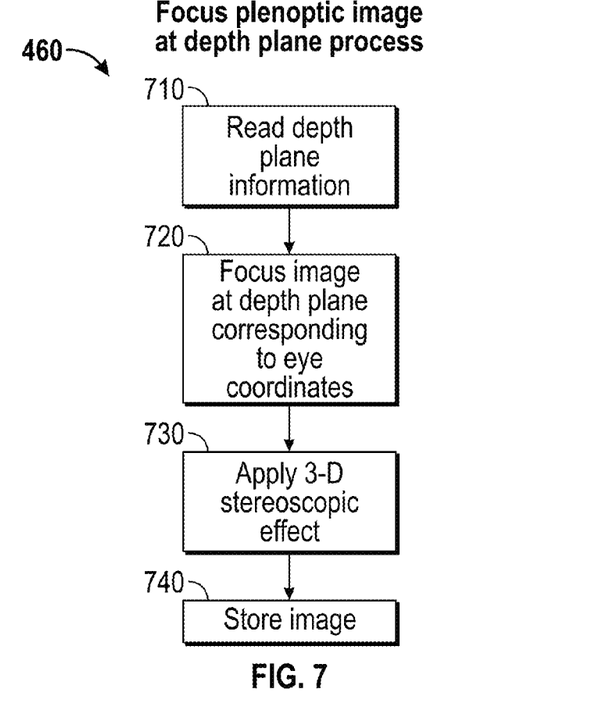
FIG. 7 is a flow diagram showing an overview of a process for mapping a user's eye coordinates to a plenoptic image depth plane.

FIG. 7 reviews in further detail the process 460 of focusing the plenoptic image at the depth plane corresponding to the viewer's gaze. The process begins with block 710 to read the depth plane information from the stored depth plane from block 630 discussed above. Next the process moves to block 720 to focus the currently displayed plenoptic frame at the depth plane corresponding to the viewer's 2-D eye coordinates on the plenoptic frame. The process also includes the capability for stereoscopic 3-D as shown by block 730, such that the focused depth plane of the plenoptic frame has a 3-D effect to it, appearing similar to how one would view a scene in the real world. As discussed above, the depth plane to be made in focus may vary from plenoptic frame to frame in the plenoptic video stream. Finally, the process stores the current focused plenoptic frame in memory as shown by block 740.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Pert, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A system for generating plenoptic images, the system comprising:
- a plenoptic image source capable of generating at least one plenoptic image having a plurality of depth planes;
- a depth mapping module configured to assign an object in the at least one plenoptic image to one of the plurality of depth planes;
- a display for displaying the at least one plenoptic image having the object assigned to the one of the plurality of depth planes; and
- an eye-tracking system configured to track the position of a user's gaze to the object in one of the plurality of depth planes of the displayed plenoptic image, and set the focal plane of the displayed plenoptic image to the depth plane of the object being viewed by the user.

2. The system of claim 1, wherein the at least one plenoptic image is a video of plenoptic images.

3. The system of claim 1, wherein the at least one plenoptic image is a stereoscopic image.

4. The system of claim 1, wherein the at least one plenoptic image is a two-dimensional image.

5. The system of claim 1, wherein the eye-tracking system comprises glasses worn by the user to track the movements and coordinates of the user's eyes.

6. The system of claim 1, wherein the eye-tracking system comprises an infra-red system configured to track the movements and coordinates of the user's eyes.

7. The system of claim 1, wherein the plenoptic image source is capable of displaying a video comprising plenoptic image frames.

8. A method for setting a focal plane of an image viewed by a user, comprising:
- generating at least one plenoptic image having a plurality of depth planes;
- mapping an object in the at least one plenoptic image to one of the plurality of depth planes;
- displaying the at least one plenoptic image having the object assigned to the one of the plurality of depth planes on a display;
- tracking the position of a user's gaze to the object in one of the plurality of depth planes of the displayed plenoptic image; and
- setting the focal plane of the displayed plenoptic image to the depth plane of the object being viewed by the user.

9. The method of claim 8, wherein the at least one plenoptic images is a video of plenoptic images.

10. The method of claim 8, wherein the at least one plenoptic image is
a two-dimensional image.

11. The method of claim 8, wherein the tracking the position of a user's gaze comprises glasses worn by the user to track the movements and coordinates of the user's eyes.

12. The method of claim 8, wherein the tracking the position of a user's gaze comprises an infra-red system configured to track the movements and coordinates of the user's eyes.

13. A system of setting a focal plane of a plenoptic image, comprising:
- means for generating at least one plenoptic image having a plurality of depth planes;
- means for mapping an object in the at least one plenoptic image to one of the plurality of depth planes;
- means for displaying the at least one plenoptic image having the object assigned to the one of the plurality of depth planes on a display;
- means for tracking the position of a user's gaze to the object in one of the plurality of depth planes of the displayed plenoptic image; and
- means for setting the focal plane of the displayed plenoptic image to the depth plane of the object being viewed by the user.

14. The system of claim 13, wherein the means for generating at least one plenoptic image comprises a plenoptic camera.

15. The system of claim 13, wherein the means for mapping objects in the at least one plenoptic image to a depth plane comprises a coordinate mapping module.

16. The system of claim 13, wherein the means for displaying the at least one plenoptic image comprises a display device.

17. The system of claim 13, wherein the means for tracking the position of a user's gaze on the display comprises eye-tracking glasses.

18. The system of claim 13, wherein the means for tracking the position of a user's gaze on the display comprises an infra-red eye-tracking system.

19. The system of claim 13, wherein the means for setting the focal plane of the displayed image to a depth plane being viewed by the user comprises a depth plane focus module.

20. A non-transitory computer readable media, comprising instructions that when executed by a processor, cause the processor to perform a method of setting a focal plane of a plenoptic image, wherein the method comprises:
- generating at least one plenoptic image having a plurality of depth planes;
- mapping an object in the at least one plenoptic image to one of the plurality of depth planes;
- displaying the at least one plenoptic image having the object assigned to the one of the plurality of depth planes on a display;
- tracking the position of a user's gaze to the object in one of the plurality of depth planes of the displayed plenoptic image; and
- setting the focal plane of the displayed plenoptic image to the depth plane of the object being viewed by the user.

* * * * *